United States Patent
Mäckle et al.

(10) Patent No.: US 6,695,085 B2
(45) Date of Patent: Feb. 24, 2004

(54) PARKING-IN AND PARKING-OUT SYSTEM AND METHOD FOR PASSENGER CARS

(75) Inventors: Günther Mäckle, Stuttgart (DE); Thomas Schirle, Oehringen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/118,326

(22) Filed: Apr. 9, 2002

(65) Prior Publication Data

US 2002/0157889 A1 Oct. 31, 2002

(30) Foreign Application Priority Data

Apr. 9, 2001 (DE) .......................... 101 17 651

(51) Int. Cl.$^7$ ................................................ B60S 11/00
(52) U.S. Cl. ........................................ 180/167; 180/204
(58) Field of Search .............................. 180/204, 167, 180/169, 199; 280/761; 701/41, 2

(56) References Cited

U.S. PATENT DOCUMENTS

| | | | | |
|---|---|---|---|---|
| 5,297,650 A | * | 3/1994 | Gandiglio et al. | 180/204 |
| 5,350,033 A | * | 9/1994 | Kraft | 180/167 |
| 5,461,292 A | * | 10/1995 | Zondlo | 318/587 |
| 5,995,879 A | * | 11/1999 | Ginzel et al. | 701/2 |
| 6,097,314 A | * | 8/2000 | Desens et al. | 340/932.2 |
| 6,170,591 B1 | * | 1/2001 | Sakai et al. | 180/204 |
| 6,374,164 B1 | * | 4/2002 | Eklind et al. | 701/2 |
| 6,527,612 B2 | * | 3/2003 | Wong | 446/175 |
| 2002/0036105 A1 | * | 3/2002 | Birmanns et al. | 180/65.1 |

FOREIGN PATENT DOCUMENTS

| | | |
|---|---|---|
| DE | 908576 | 4/1954 |
| DE | 3844340 A1 | 7/1990 |
| DE | 10030449 | 1/2001 |
| EP | 0479735 | 9/1991 |
| FR | 2764091 | 12/1998 |

* cited by examiner

*Primary Examiner*—Avraham Lerner
(74) *Attorney, Agent, or Firm*—Crowell & Moring LLP

(57) ABSTRACT

A system for operating a vehicle includes a motor control and a parking logic that is operatively associated with the motor control. The parking logic is configured to be remotely controlled to maneuver the vehicle, which is placed in alignment with a parking space and the steering of which is locked, into the parking space under a maximum speed along a straight line.

6 Claims, 2 Drawing Sheets

PARKING-IN AND PARKING-OUT SYSTEM AND METHOD FOR PASSENGER CARS

This application claims the priority of German Patent Document No. 101 17 651.1, filed Apr. 9, 2001, the disclosure of which is expressly incorporated by reference herein.

BACKGROUND AND SUMMARY OF THE INVENTION

The invention relates to a parking/parking-out system and method, particularly for compact city vehicles.

Compact city vehicles offer the possibility of utilizing parking areas which have not been accessible to passenger cars. A special advantage of a compact city vehicle with its short vehicle length is the possibility of parking the vehicle at the edge of the road transversely to the course of the road. The required width of such a transverse parking space is determined by the vehicle width plus the space required to open the side doors.

For parking a motor vehicle parallel to the road direction, various automatic parking aids have been devised to assist the vehicle driver to steer the vehicle into a parking space. These known systems automatically measure, by means of sensors, an available parking space and emit in a computer-aided manner maneuvering information for the vehicle driver (German Patent Document DE-A1-3844340).

It is an object of the invention to provide a parking/parking-out system and method for parking passenger cars along a straight-line into a parking space, making it possible for the vehicle driver to utilize parking areas whose small width does not permit a person to laterally exit from the parked vehicle.

According to the present invention, the vehicle is placed in front of, and aligned with, a parking space. After all vehicle occupants have exited, the vehicle can be maneuvered using a manually operated remote control rearwards or forwards into the parking space. The maneuvering according the invention using the remote control also takes place at a controlled parking speed in a visually determined manner. The steering system is locked for straight-line driving.

The solution according to the invention has the advantage that no costly sensors for analyzing the environment and no devices to aid steering are required. When a vehicle has the basic equipment of a computer-aided motor control, such as a computer-aided engine control and any other computer-aided control system of the vehicle, and a controllable parking brake, the parking system according to the invention can be easily integrated as an accessory module in the vehicle. The remote control can advantageously be integrated in a wireless locking system.

Because the present invention allows a vehicle to be parked in a small parking space, economic advantages can be achieved for parking of passenger cars in parking garages which takes place by a forward or rearward straight-line driving.

Because of better visual control outside a vehicle, the invention also has advantages when objects, such as a lifting platform or a trailer coupling device, must be approached precisely.

Other objects, advantages and novel features of the present invention will become apparent from the following detailed description of the invention when considered in conjunction with the accompanying drawings.

DETAILED DESCRIPTION OF THE DRAWINGS

Figure 1:
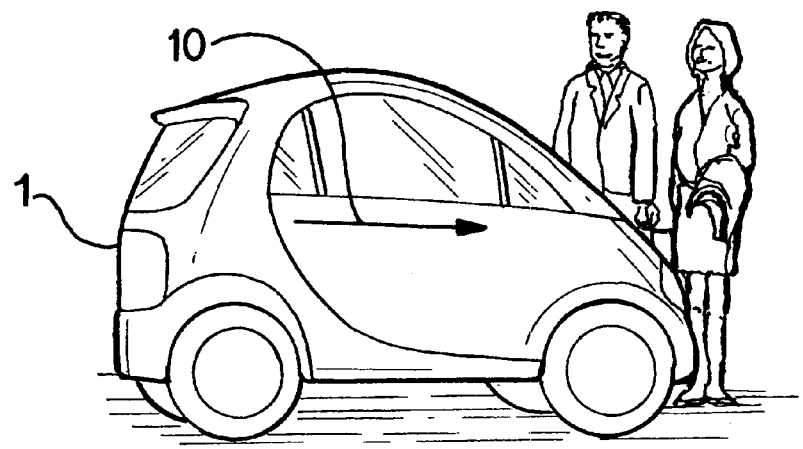
FIG. 1 shows a compact vehicle suitable for the present invention.
Figure 3:
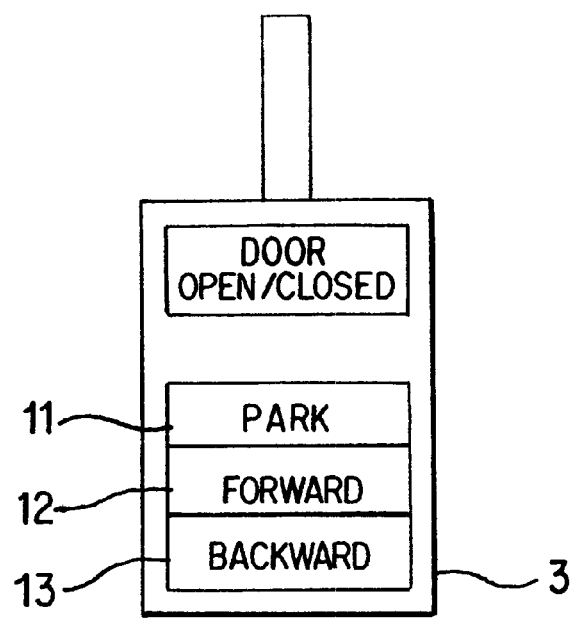
FIG. 3 illustrates a vehicle key having the control functions of the present invention.
Figure 2:
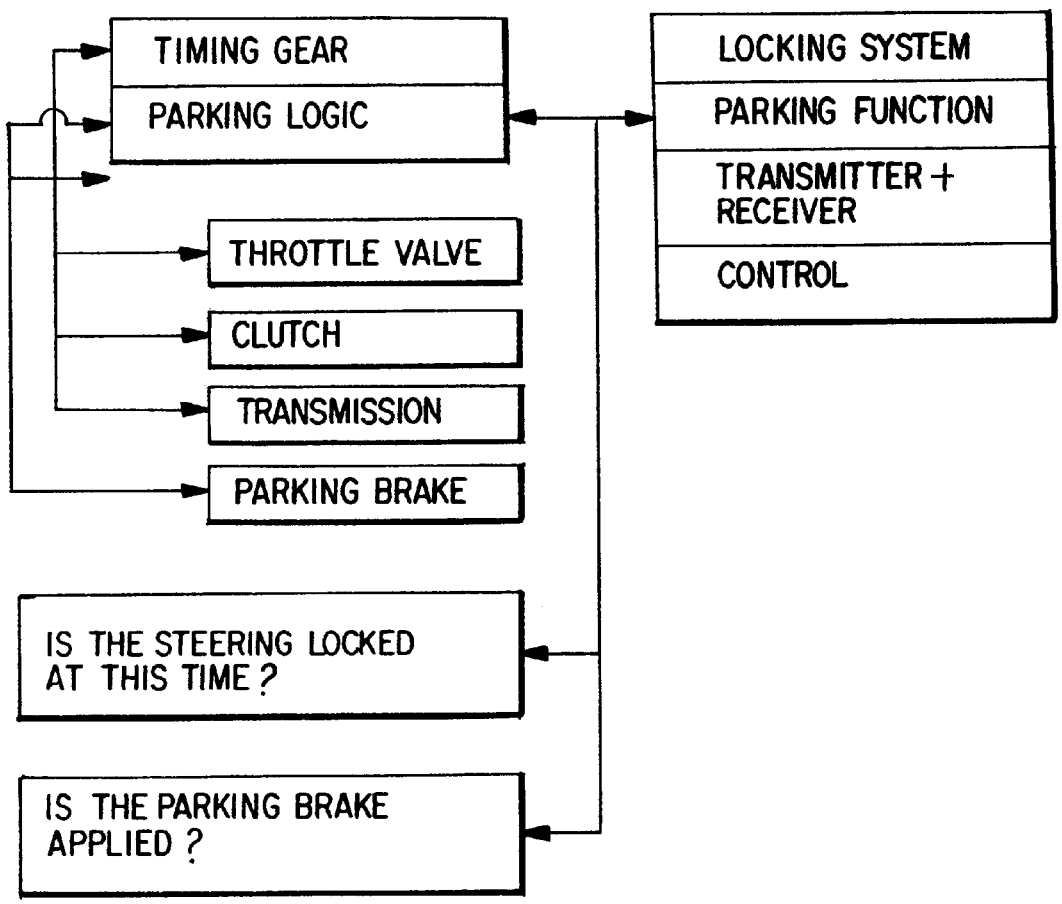
FIG. 2 illustrates the functions of a wireless door locking system of the present invention.

FIG. 1 illustrates a compact vehicle 1, which is equipped with a wirelessly controllable door locking system 2 shown in FIG. 2. To control this door locking system, as shown in FIG. 3, remote control functions are integrated in the vehicle key 3 equipped with a transmitter. The remote control functions include the "parking", "forward" and "backward" functions. Furthermore, the vehicle 1 is equipped with a computer-aided motor control 4 which has a parking logic 5 acting upon it. The motor control 4 electronically controls the actuators of the engine, a clutch 7 and a transmission 8 for adjusting the gears. The engine actuators may include a throttle valve 6 for the fuel supply.

In addition to or as an alternative to the above-mentioned actuators, the motor control may also control an automatic transmission having a torque converter and, instead of the throttle valve, may act upon other known electronic actuators for fuel injection.

Instead of supplementing an existing motor control 4 with the parking logic 5, a motor control with an integrated parking logic can also be used according to the present invention.

As an alternative to the above-described expanded wireless door locking system, the remote control of the parking logic 5 can be replaced by a wired control panel which, after the completion of the parking operation, can be stored in a secured container of the vehicle which is accessible from the outside.

For parking and parking-out, the parking logic 5 receives instructions wirelessly transmitted by the vehicle driver using the vehicle key 3. For this purpose, the standard door locking system 2 is supplemented according to the invention with corresponding reception and internal output modules.

Before activating a "parking" function, the vehicle driver has to ascertain that the vehicle position is suitable for parking. Furthermore, before the vehicle is exited, the steering must have been locked by the steering wheel lock and the parking brake 9 must have been applied. The latter conditions are monitored by the parking logic 5. When the vehicle is exited, the removal of the vehicle key 3 from the ignition lock shuts off the engine. The engine start and switch-off by way of the ignition lock can take place alternatively as in the case of a truck by way of a separate starting/stopping push-button. The parking logic must be coordinated with the ignition lock to accomplish these functions.

Instead of manually locking the steering wheel by way of the steering wheel lock, as an alternative, a steering wheel locking can be provided which is electronically controlled by the parking logic 5.

The "parking" function can be activated manually by a push button 11 on the vehicle key 3. After the push button 11 is activated, the parking function remains activated, and the parking logic 5 checks whether the steering system is locked and the parking brake 9 is applied. If these conditions have been met, the parking logic 5 causes the motor control 4 to initiate an automatic idling start of the engine. Otherwise, the engine does not start.

After the engine has been started, the vehicle driver, by manually activating the "forward" and "backward"

functions, can move the vehicle back and forth in the direction of the arrow 10 along a straight-line. The activation of these functions takes place by means of push-buttons 12 and 13. The "forward" and "backward" functions remain activated only as long as the corresponding push-buttons 12, 13 are pressed. This ensures a direct control of the vehicle. In case of a malfunction, such as when the vehicle moves forward instead of backward or when it moves too fast, the vehicle can be stopped immediately by releasing the push-button 12, 13. Furthermore, loss of control is also avoided when, for example, the vehicle key is dropped. Additionally or alternatively, the vehicle key may be equipped with a push-button for an emergency stop 1, which can also be used in case of a malfunction of the parking logic 5.

For displaying any malfunction, such as when the steering system or the parking brake is not locked before engine start, the vehicle key 3 or the wired control panel may be equipped with bidirectional communication devices. In the case of the vehicle key 3, this means that, in addition to the transmitter, it also contains a receiver which interacts with a transmitter of the door locking system 2. In the case of the wired control panel, these are corresponding input and output interfaces. The warning message can be, for example, visually indicated by a simultaneous flashing of all push-buttons 11, 12, 13.

When the "forward" and "backward" functions are activated, the parking logic 5 causes the motor control 4 to engage a transmission gear, open the throttle valve 6 to a limited extent and release the parking brake 9, to allow the vehicle to move forward or backward. After the release of the push-buttons 12, 13, the vehicle is stopped by the parking brake 9. The vehicle driver controls the vehicle by, possibly successively, activating the "forward" and "backward" buttons and by the duration of their activation. When the desired final parking position is reached, the parking operation is completed by another activating of the "parking" function, in which case the parking logic 5 and the motor control 4 stop the engine and apply the parking brake 9.

The maximum speed for the parking is limited by the parking logic 5 to, for example, 0.5 m/s. For this purpose, the parking logic acts upon the motor control 4 and upon the parking brake 9 to adjust the speed by selectively applying the brake.

The parking brake 9 is equipped with a so-called "fail-safe" function which automatically applies the brake, for example, as a result of a power failure or as a result of insufficient braking energy.

In an alternative embodiment, the push-buttons 11, 12, 13 on the vehicle key 3 may be toggle switches, rocker switches or similar elements and may have a visual indicator for signaling their activation. The operating elements for controlling the parking operation may be covered by a flap on the vehicle key 3, which flap can help to avoid an unintentional activation of the elements.

Furthermore, traffic safety can be increased by a parking system of the present invention because during parking, the emergency flashing function, which is standard equipment in the vehicle, may be activated by the parking logic 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A system for parking a vehicle comprising:
a computer-aided motor control;
a parking logic, wherein the motor control is expanded by the parking logic which can be remotely controlled by an exited vehicle driver such that the vehicle placed in front of a parking space, while the steering system of the vehicle is locked, can be maneuvered alone a straight line into the parking space;
wherein the remote control of the parking logic takes place by way of a vehicle key, which communicates with a wirelessly controllable door locking system of the vehicle; and
wherein the door locking system and the vehicle key are each equipped with a transmitter and a receiver, and any malfunction detected by the parking logic is transmitted to the vehicle key and is visually indicated on the vehicle key.

2. A system for parking a vehicle comprising:
a computer-aided motor control; and
a parking logic, wherein the motor control is expanded by the parking logic which can be remotely controlled by an exited vehicle driver such that the vehicle placed in front of a parking space, while the steering system of the vehicle is locked, can be maneuvered alone a straight line into the parking space, wherein during parking operation, the parking logic automatically activates the emergency flashing function of the vehicle.

3. A system for parking a vehicle comprising:
a computer-aided motor control;
a parking logic, wherein the motor control is expanded by the parking logic which can be remotely controlled by an exited vehicle driver such that the vehicle placed in front of a parking space, while the steering system of the vehicle is locked, can be maneuvered alone a straight line into the parking space;
wherein the remote control of the parking logic takes place by way of a wired control panel which, after the completion of the parking operation, can be stored in a secured container of the vehicle which is accessible from the outside; and
a door locking system, wherein the door locking system and the wired control panel are each equipped with input and output elements for bidirectional communication, and any malfunction detected by the parking logic is transmitted to the wired control panel and is visually indicated on the wired control panel.

4. A system for operating a vehicle comprising:
a motor control;
a parking logic operatively associated with the motor control, wherein the parking logic is configured to be remotely controlled to maneuver the vehicle, which is placed in alignment with a parking space and the steering system of which is locked, into the parking space along a straight line under a maximum speed; and
a vehicle key for remotely controlling the parking logic, the vehicle key including a transmitter that communicates with a wirelessly controlled door locking system of the vehicle, wherein upon receiving malfunction information from the parking logic, the vehicle key visually indicates detection of a malfunction.

5. A system for operating a vehicle comprising:
a motor control; and
a parking logic operatively associated with the motor control, wherein the parking logic is configured to be remotely controlled to maneuver the vehicle, which is placed in alignment with a parking space and the steering system of which is locked, into the parking space along a straight line under a maximum speed, wherein during parking operation, the parking logic automatically activates the emergency flashing function of the vehicle.

6. A system for operating a vehicle comprising:

a motor control;

a parking logic operatively associated with the motor control, wherein the parking logic is configured to be remotely controlled to maneuver the vehicle, which is placed in alignment with a parking space and the steering system of which is locked, into the parking space alone a straight line under a maximum speed; and a wired control panel for remotely controlling the parking logic, wherein the wired control panel is configured to be stored, after completion of parking operation, in a container of the vehicle which is accessible outside of the vehicle, wherein any malfunction detected by the parking logic is transmitted to the wired control panel and is visually indicated on the wired control panel.

* * * * *